United States Patent [19]
Cunningham

[11] Patent Number: 4,781,400
[45] Date of Patent: Nov. 1, 1988

[54] QUICK CONNECT TUBE COUPLING

[75] Inventor: Gail M. Cunningham, Frankenmuth, Mich.

[73] Assignee: General Motors Corporation, Detroit, Mich.

[21] Appl. No.: 68,457

[22] Filed: Jul. 1, 1987

[51] Int. Cl.[4] .............................................. F16L 37/12
[52] U.S. Cl. ..................................... 285/39; 285/319; 285/921
[58] Field of Search ................ 285/319, 39, 921, 910, 285/322; 277/235 R

[56] References Cited

U.S. PATENT DOCUMENTS

| | | | |
|---|---|---|---|
| 1,872,182 | 8/1932 | Pohl | 285/910 X |
| 2,127,086 | 8/1938 | McGrath | 285/39 |
| 2,459,981 | 1/1949 | Warren | 277/235 X |
| 2,550,591 | 4/1951 | Parsons | 285/319 |
| 4,035,005 | 7/1977 | DeVincent et al. | 285/319 |
| 4,133,564 | 1/1979 | Sarson et al. | 285/321 |
| 4,191,408 | 3/1980 | Acker | 285/113 |
| 4,293,138 | 10/1981 | Swantee | 285/910 X |
| 4,332,402 | 6/1982 | Shellhause | 285/322 X |
| 4,541,658 | 9/1985 | Bartholomew | 285/319 |
| 4,601,497 | 7/1986 | Bartholomew | 285/921 X |
| 4,645,245 | 2/1987 | Cunningham | 285/321 |

FOREIGN PATENT DOCUMENTS 1533785 11/1978 United Kingdom ................. 285/39

Primary Examiner—Thomas F. Callaghan
Attorney, Agent, or Firm—Arthur N. Krein

[57] ABSTRACT

A quick connect tube coupling assembly includes a tubular seal member, in the form of a tubular member with an elastomer molded thereon is suitably fixed in the stepped socket bore of a tube receiving socket member, this seal member, in effect, providing the effect of two O-rings, a spacer, retainer and end seal; and a spring retainer is fixed to the socket member whereby this coupling body assembly is adapted to telescopically receive a plug tube having axially spaced apart radial upstanding annular inboard and outboard beads thereon, one of which is adapted to be engaged by the spring retainer. A tubular spring release member is positioned to encircle the tube loosely between the beads whereby the tube can be un-coupled, when desired, by moving this release member axially in a direction toward the inboard bead so as to cause the spring member to flux radially outward of the inboard bead whereby the plug tube can be removed manually from the socket member.

2 Claims, 1 Drawing Sheet

QUICK CONNECT TUBE COUPLING

FIELD OF THE INVENTION

This invention relates to tube couplings and, in particular, to a quick connect tube coupling assembly for use in hydraulic systems.

DESCRIPTION OF THE PRIOR ART

Quick connect tube couplings, of the type which permit initial assembly by mere insertion of the end of a tube into a body assembly, are well known in the art as disclosed, for example, in U.S. Pat. Nos. 4,133,564 issued Jan. 9, 1979 to Charles R. Sarson and Frederick S. Browne; U.S. Pat. No. 4,191,408 issued Mar. 4, 1980 to Richard C. Acker; and, U.S. Pat. No. 4,645,245 issued Feb. 24, 1987 to Gail M. Cunningham. Such couplings usually provide a resilient seal ring sealingly engaged by the tube and a split ring lock system for the tube or alternatively a pair of seal rings with a spacer and a separate seat to provide a sealing surface and to retain the seal rings and spacer, are used in commercially available quick connect tube couplings, the arrangement in each being such so as to allow the threaded parts of the coupling to be preassembled prior to insertion of the tube therein to complete the tube coupling.

SUMMARY OF THE INVENTION

The present invention relates to an improved quick connect tube coupling assembly wherein a tubular seal member, in the form of a tubular metal member with an elastomer molded thereon is suitably fixed in the stepped bore of a tube receiving body member, this seal member, in effect, providing the effect of two O-rings, a spacer, retainer and end seal; and a spring retainer is fixed to the body member, this coupling body assembly being adapted to receive a tube having axially spaced apart radial upstanding annular beads thereon, one of which is adapted to be engaged by the spring retainer and, a tubular spring release member is positioned to encircle the tube loosely between the beads whereby the tube can be un-coupled when desired.

It is therefore a primary object of the invention to provide an improved quick connect tube coupling having a tube with axially spaced apart radially outward extending annular beads thereon with the free or plug end of the tube having a straight wall portion at its free end which is connected to the outboard bead by a tapered tube portion, this tube being adapted to be inserted into a coupling sub-assembly that includes a tubular seal member, comprising a metal tubular member with an elastomer molded on one end thereof defining, in effect, two seal rings and an end seal axially, retained in the stepped bore of a body member with this body member having a spring retainer fixed thereto, the spring retainer having spaced apart inward extending lock fingers adapted to engage the inboard bead on the tube to effect its axial retention. In addition, a tubular spring release member loosely encircles the tube between the two beads in a position whereby it can be axially moved to unlatch the lock fingers so as to effect removal of the tube, when desired.

Another object of the invention is to provide an improved quick connect tube coupling wherein the plug end of a tube is sealingly engaged at axially spaced apart locations by a single tubular seal member and axially retained by a spring retainer.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
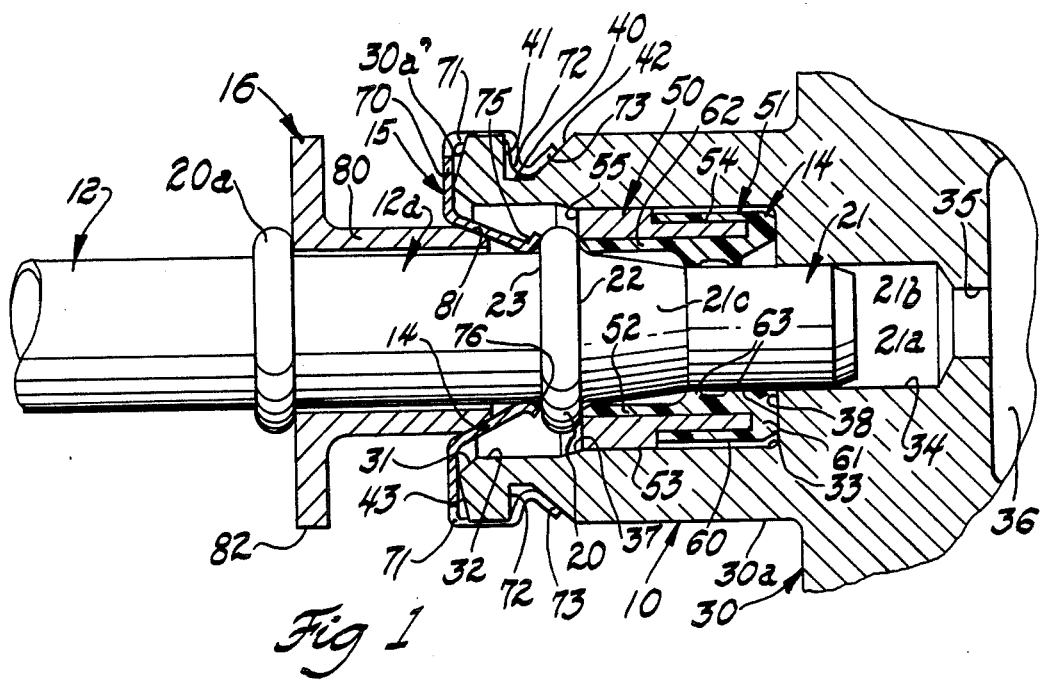
FIG. 1 is a side elevational view, partly in longitudinal section, of an assembled quick connect tube coupling assembly in accordance with the invention.
Figure 2:
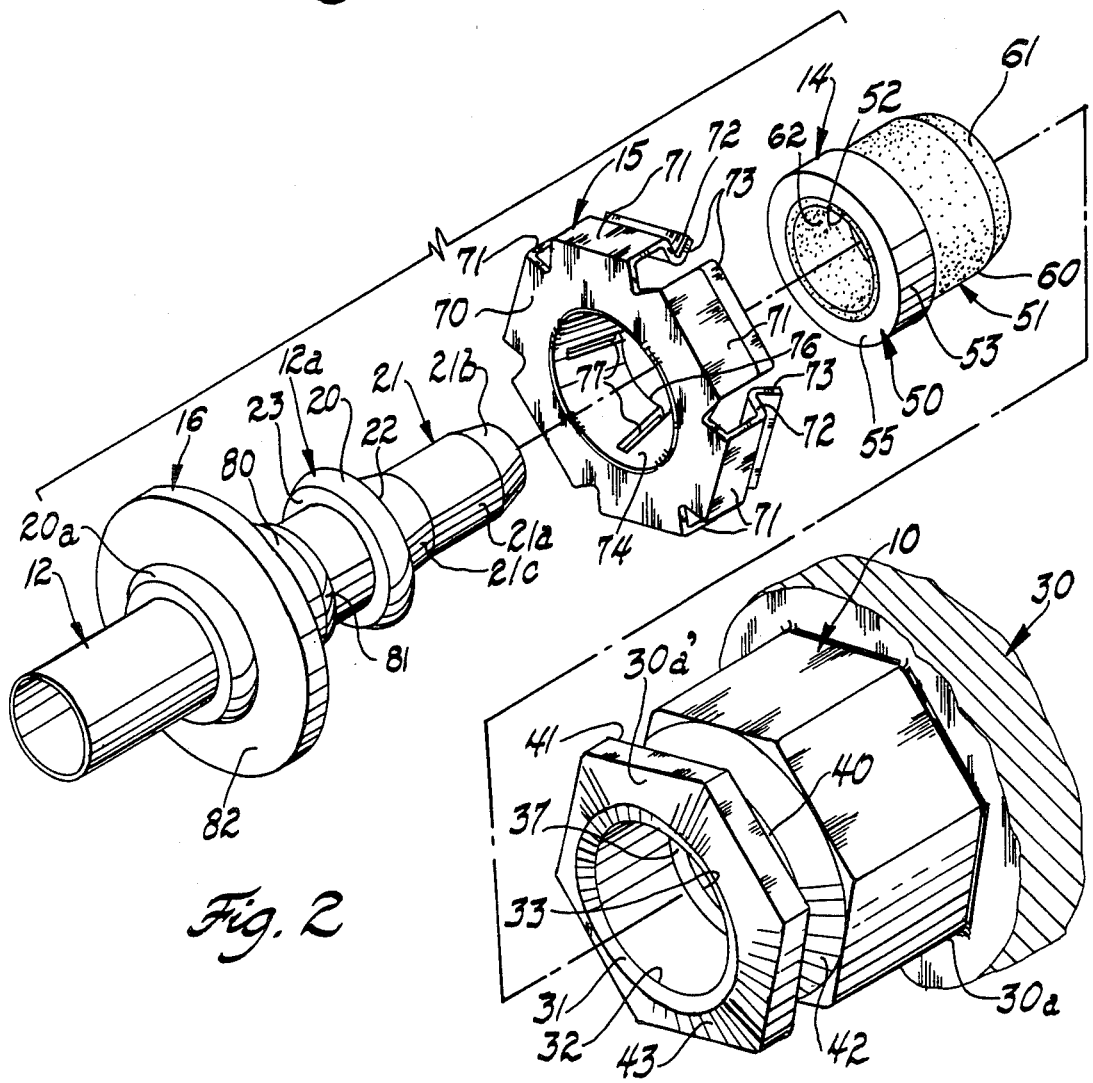
FIG. 2 is an exploded perspective view of the quick connect tube coupling assembly of FIG. 1.

Referring now to FIGS. 1 and 2 of the drawings, the quick connect coupling of the invention includes as major components thereof an outer female socket member or socket 10, a tubular plug member or male plug 12, a fluid tubular seal member 14, a spring retainer 15 used to releasably secure the socket 10 and plug 12 in assembled relationship to each other, and a spring retainer release member 16, all of these components to be described in detail hereinafter.

The socket 10 is adapted to telescopically receive the plug 12 whereby these members are used to couple two fluid conduits together. These conduits may be, for example, tubes, pipes, flexible high pressure hoses or conduit passages in machined elements. Thus the socket 10 may be a separate element with a conduit suitably secured thereto or, as shown, it may be formed as an integral part of another machine element.

The plug 12 may also be formed as a separate element with a conduit suitably secured thereto or, as shown, it is formed as an integral part of a conduit which itself may be a separate element or part of a machine element. Thus, as shown, the plug 12 is formed at one end of a conduit in the form of a tube 12a and includes a pair of axially spaced apart upstanding annular beads 20 and 20a with a tubular pilot portion 21 extending from the inboard bead 20, with reference to FIG. 1, to the free or plug end of the tube 12a. Preferably, as shown, the free end of the pilot portion, generally designated 21, includes a straight reduced diameter free end portion 21a of a predetermined axial extent and external diameter, and with a tapered end 21b portion to facilitate the assembly into socket 10, the straight reduced diameter portion 21 being connected to one or inboard side of the bead 20 by an annular inclined or frusto-conical portion 21c.

Bead 20, which can be upset or otherwise formed on the tube 12a, provides on one or inboard side thereof an annular radial shoulder 22 facing the pilot portion end 21 of the plug and, on its other side, an opposite facing annular radial abutment shoulder 23. In the construction illustrated, the abutment shoulder 23 and therefor bead 20 will be positioned inside the socket 10, when the plug 12 is fully operably inserted therein, as shown in FIG. 1. Bead 20a, which can also be upset or otherwise formed on the tube 12a is similar to bead 20 and is axially spaced therefrom a predetermined axial extent, for a purpose to be described, whereby, as the plug 12 is assembled in socket 10, the bead 20a will be located outboard of the socket 10.

Socket 10, in the embodiment illustrated, is formed as an integral part of a machine element 30 that forms part of a relatively high pressure hydraulic system, although it will be apparent, as described hereinabove, that the socket could be formed as an integral end part of a tube, an other conduit member or an adapter that would be threaded at one end, not shown, for connection to another member.

Referring again to the embodiment illustrated, the socket 10 is formed in a boss-like, hexagonal extension 30a of the machine element 30 that is provided with a stepped bore therethrough. This stepped bore defines in succession starting from the free end of the extension at least a cylindrical first internal wall 32, a cylindrical second internal wall 33 and a cylindrical third wall 34, the latter being connected to a cylindrical fourth wall 35 that forms a passage opening into an interior cavity 36 within the machine element 30. Walls 35, 34 and 33 are of progressively reduced diameters relative to the wall 32. As shown, the wall 32 is of a suitable internal diameter greater than the outside diameter of the bead 20 whereby the bead can be loosely slidably received therein and the wall 34 is of an internal diameter suitably greater than the maximum outside diameter of the pilot portion 21a so as to slidably receive this pilot portion therein.

Preferably, as shown in FIG. 1, wall 32 at its outboard end is connected to a chamfered end surface 31 and at its inboard end is connected to wall 33 by an inclined shoulder 37. Walls 33 and 34 are connected by a flat radial abutment shoulder 38. In addition, the extension 30a adjacent to its outer free end, the left end with reference to FIG. 1, is provided with an annular groove 40 defined in part by a radial straight outboard shoulder 41 and an inclined inboard shoulder 42, in the construction illustrated. Also, the free end surface 30a' of the extension 30a is preferably chamfered as at 43 to facilitate assembly of the spring retainer 15 onto this extension 30a.

The fluid tubular seal member 14 includes a tubular member 50 with a suitable elastomer 51, which elastomer material, such as rubber, is molded onto one end thereof. As best seen in FIG. 1, the tubular member 50, in the construction shown, is of a uniform internal diameter so as to define a straight wall 52 and is of a stepped external diameter so as to provide a first enlarged external diameter outboard portion 53 having a preselected external diameter relative to the internal diameter of wall 33 whereby the tubular member 50 can be suitably secured in the bore wall 33, as by a press fit in the construction shown, and an inboard portion 54 of substantially reduced external diameter relative to the outboard portion 53 and thus also relative to the internal diameter of the wall 33. As shown, the internal diameter of the wall 52 is substantially greater than the external diameter of the free end portion 21a of the pilot portion 21 of plug 12, but less than the outside diameter of bead 20 so that its outboard end 55 will abut against the shoulder 22 on one side of this bead 20, as best seen in FIG. 1.

As best seen in FIG. 1, the elastomer 51, which may be of an suitable material, such as rubber, is bonded to the tubular member 50 so as to encircle inboard portion 54 whereby to define a portion 60 and which then extends axially outboard thereof to merge with and define a nib 61 of a suitable size and axial extent whereby this nib 61 can sealingly engage the flat shoulder 38 in the socket 10 when the seal member 14 is axially positioned as shown in FIG. 1. The nib 61 is also integrally connected to a return bent portion 62 that is bonded to the internal wall 52 of the tubular member 50. This latter elastomer portion 62 has integrally formed thereon a pair of axially spaced apart, radially inward extending annular ribs or beads 63. These beads 63, as formed, have maximum internal diameters that are a preselected amount less than the external diameter of the free end portion 21a of the pilot portion 21 of plug 12 so that when the latter is inserted into the seal member 14, as shown in FIG. 1, the beads 63 will sealingly engage the outer peripheral surface of this free end portion 21a whereby to prevent the leakage of fluid at a relatively high fluid pressure, such as 1500 psi.

Referring now to the spring retainer 15, it is made of a suitable spring metal, such as SAE 1050 steel, and is formed of two-sided tubular configuration so as to include a flat, hex, washer-like, disk base 70 which at its outer peripheral edge interconnects with return bent, axial extending spring flanges 71 which are spaced apart and which are six in number and sized so as to conform to the hexagonal external configuration of the hexagonal extension 30a of the socket member 10. Each spring flange 71, at the end thereof opposite the disk base 70, interconnects with a radial inward extending lock leg 72 and formed integral with each lock leg 72 is a return bent portion, the free end of which is upwardly inclined so as to define a cam ramp portion 73.

Thus during assembly of the spring retainer 15 onto the hexagonal extension 30a, these cam ramp portions 73 will cause the associate lock legs 72 and spring flanges 71 to be flexed radially outward whereby they can slide over the respective flats of the hexagonal extension 30a until the lock legs 72 can drop into the groove 40 as biased by the spring flanges 71 so that the inside surface of each of the lock legs 72 will abut against the outboard shoulder 41.

The disk base 70 at its annular inner peripheral edge interconnects with one end of an annular, radially inward inclined, frusto-conical retainer ring 74, the opposite end of the retainer ring being provided with a radial outward extending flange 75 which define an abutment surface 76. Preferably as shown, a plurality of axially extending slots 77 are formed so as to extend through the flange 75 and a portion of the retainer ring 74 whereby to define, in effect, a plurality of flexible ring and flange segments. Four such flexible segments and flanges 75 are provided in the construction shown, whereby these flexible segments can be sprung over the bead 20 during insertion of the plug 12 through the spring retainer 15 so that the abutment surface 76 of each flexible segment can then be biased into engagement against the abutment shoulder 23 of the bead 20 of the plug 12 to effect its axial retention in the socket 10 in the position shown in FIG. 1. Thus the flanges 75 and the flexible segments of the retainer ring define a plug retainer means.

In the preferred construction shown, a spring retainer release member 16 is operatively positioned to loosely encircle the tube 12a of plug 12 between the beads 20 and 20a and this release member 16 is of a predetermined axial extent less than the axial extent between the opposed surfaces of these beads 20 and 20a.

The spring retainer release member 16 is preferably made of a suitable plastic which can be molded as one tubular piece to be positioned on the tube 12a prior to the formation of one of the beads 20 or 20a thereon or, it can be molded, in effect, as a two piece part with a living hinge, not shown, interconnecting the parts so that it can be snapped around the tube 12a after the beads 20 and 20a are formed on the tube 12a.

As shown, the spring retainer release member 16 includes a tubular portion 80, of a predetermined axial extent, having an inwardly inclined ramp surface 81 at its free or inboard end, the right hand end with reference to FIG. 1, and at its opposite end is integrally connected to a radial outward extending annular flange 82, the external diameter of which is substantially greater than the external diameter of bead 20a, against which it normally abuts, so that a mechanic can grip the flange 82 to force the spring retainer release member 16 in an axial direction toward bead 20. As this occurs, its ramp surface 81 is forced into engagement with the flexible ring and flange segments of the spring retainer 15 spreading them radially outward so that their flanges 75 will be released relative to the bead 20 to then allow removal of the plug 12.

As should now be apparent, the tubular seal member 14 is secured as by a press fit of the outboard portion 53 of its tubular member 50 in the opening defined by wall 33 and is thus axially positioned so that the nib 61 is compressed against the shoulder 38 so as to sealingly engage this shoulder 38 to keep fluid from leaking around the exterior of the seal member 14. The spring retainer 15 is aligned and then axially forced over the free end of the hexagonal extension 30a until the lock legs 72 can snap into groove 40 for abutment against the shoulder 41, the position shown in FIG. 1.

The plug 12 with the spring retainer release member 16 assembled between the bead 20, 20a can then be pushed into the socket member 10. As this occurs, the inboard bead 20 will cause the flexible ring segments 74 of the spring retainer 15 to spread radially outward so as to allow passage of the bead 20 therethrough, with the flexible segments then biasing their flanges 75 radially inward so that the associate abutment surfaces 76 will abut against the shoulder 23 of this bead 20 and thus force the opposite shoulder 22 into abutment against the tubular seal member 14.

As the above occurs, the tubular pilot portion 21 of plug 12 will pass through the tubular seal member 14 so as to sealingly engage the beads 63 whereby to effect an internal seal. The inboard end of the straight free end 21a of the pilot portion 21 will pilot itself via the tapered portion 21b into the passage defined by wall 34 to thus center the plug 12 and provide additional stability of the plug 12 within the socket member 10.

While the invention has been described with reference to the structure disclosed herein, it is not confined to the specific details set forth, since it is apparent that modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. A quick connect tube coupling comprising a socket member, a plug member, a tubular seal member and a spring member; said plug member being of tubular configuration with a pair of axially spaced apart upstanding annular inboard and outboard beads thereon and with a reduced diameter pilot tube portion extending from said inboard bead, said inboard bead defining on its inboard side a radial shoulder and on its opposite side an abutment shoulder; said socket member having a socket bore therein that extends from a hexagonal end thereof so as to define at least an annular first internal wall, a second wall and a pilot tube receiving wall, with a radial abutment shoulder interconnecting said second wall to said pilot tube receiving wall and an annular groove in the outer peripheral surface of said hexagonal end of said socket member; said tubular seal member including a tubular member adapted to be secured in said second wall and an elastomer fixed to said tubular member in a configuration so as to define an axially extending nib for sealing engagement with said radial abutment shoulder and to define a pair of axially spaced apart beads sized so as to sealingly engage the outer peripheral surface of said pilot tube portion; and, spring retainer including a washer-like disk base having the outer peripheral edge thereof connected to circumferentially spaced apart spring fingers with each said spring flanges terminating at the free end thereof with lock leg means engageable in said annular groove to effect axial retention of said spring retainer to said socket member and, a plug retainer means interconnected to the inner peripheral edge of said disk base, said plug retainer means extending in the same axial direction as said spring fingers whereby said plug retainer means will abut against said abutment shoulder of said inboard bead is fully inserted into said socket member such that said radial shoulder of said inboard bead abuts against said tubular member of said seal member.

2. A quick connect tube coupling according to claim 1 wherein said coupling further includes a tubular spring retainer release member loosely encircling said plug member between said inboard and outboard beads and which is adapted to be manually axially moved to bias said plug retainer means radially outward whereby said plug member can be manually removed from said socket member.

* * * * *